Nov. 18, 1924.

W. L. PADEN 1,515,879

OILING DEVICE FOR SPRING LEAF SHACKLES

Filed Aug. 25, 1923

INVENTOR
William L. Paden

BY
George B. Willey
ATTORNEY

Patented Nov. 18, 1924.

1,515,879

UNITED STATES PATENT OFFICE.

WILLIAM L. PADEN, OF SAGINAW, MICHIGAN.

OILING DEVICE FOR SPRING-LEAF SHACKLES.

Application filed August 25, 1923. Serial No. 659,346.

*To all whom it may concern:*

Be it known that I, WILLIAM L. PADEN, a citizen of the United States, residing at Saginaw, in the county of Saginaw and State of Michigan, have invented certain new and useful Improvements in Oiling Devices for Spring-Leaf Shackles; and I do hereby declare the following to be a full, clear, and exact description of the invention, such as will enable others skilled in the art to which it appertains to make and use the same.

This invention is an attachment for spring clips of leaf springs such as are commonly used on motor vehicles. The objects are to provide a simple and inexpensive oil dispensing device that can be easily applied to clips and clip bolts of the ordinary type and already in use on vehicles.

When in place the oil dispensing device serves as a thimble or spacer, also as a chamber or reservoir, the clip arms being availed of to constitute the two ends of the reservoir.

The oil reservoir has capillary openings in its bottom at or near its ends and also has an oil inlet with an airtight closure. The construction and arrangement of parts is such that oil is permitted to flow down the inner faces of the clip arms and onto the side edges of the spring leaves when the clip is vibrated. Oil is also delivered when the inlet is opened, but at other times practically no oil can escape from the reservoir.

Another object of my improvement is to provide an effective leaf spring oiling device that delivers oil to the springs by capillary action and atmospheric pressure, but without the employment of wicks or absorbent pads.

With the foregoing and certain other objects in view which will appear later in the specifications, my invention comprises the devices described and claimed and the equivalents thereof.

In the drawings, Fig. 1 is a part sectional front view of an ordinary clip and bolt with my device applied thereto.

Figure 1:
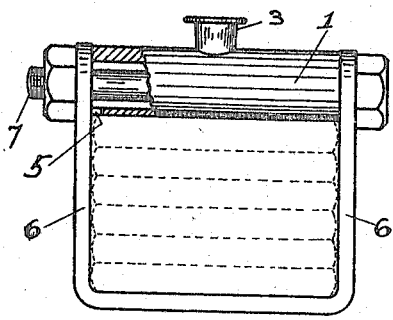

As is clearly shown in the drawings, the spacer is a hollow tubular member of length equal to the distance between the arms of the clip on which it is to be used. In cross sectional shape it may be circular as at 1, angular as at $1^a$, or of any other suitable cross section, but is preferably flat bottomed as at 2. It may be made of metal tubing or formed of sheet metal, as shown in Fig. 5.

Figure 2:
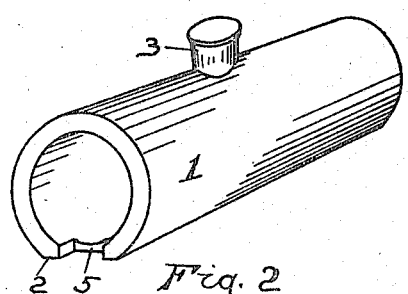
Figs. 2, 3 and 4 are perspective views showing various forms of capillary apertures.
Figure 3:
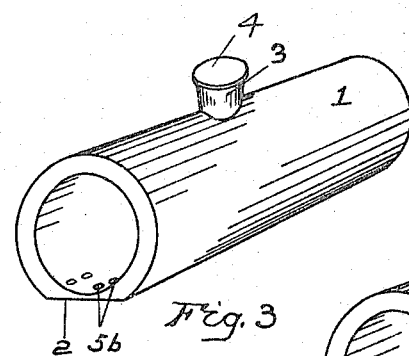
Figure 4:
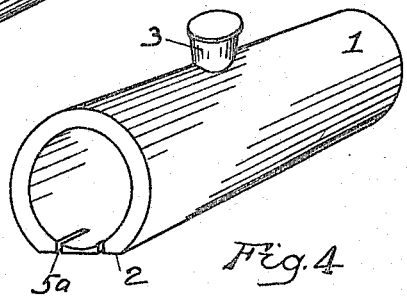

The tubular spacer is provided with an oil inlet 3 having a substantially air-tight closure 4. The bottom side of the tube at or near its ends is provided with one or more small openings which may be in the form of a transverse notch 5, as in Figs. 1 and 2, or longitudinal slits $5^a$, as in Fig. 4, or small perforations $5^b$, as in Figs. 3, 5, 6 and 7, or any other suitable small openings.

The size of the openings is such as to produce the desired oil delivery when the clip is vibrated, say, equivalent to an opening of about one-sixteenth inch diameter. The openings are located close to the ends of the tube and adjacent the inner faces of the clip arms 6. The spacer is clamped in place by the clip bolt 7.

Figure 5:
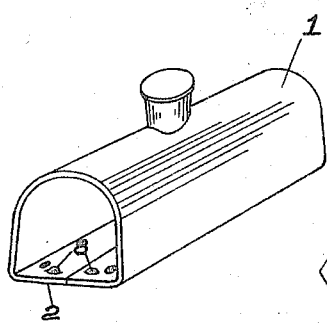
Fig. 5 is a perspective view of the device as made of sheet metal.
Figure 6:
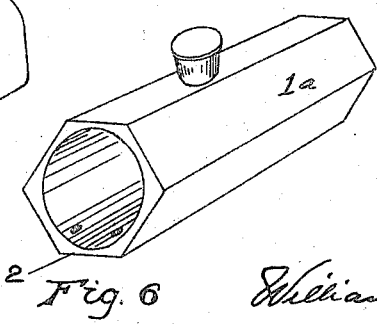
Fig. 6 is a modified form made of tubing of angular cross section.
Figure 7:
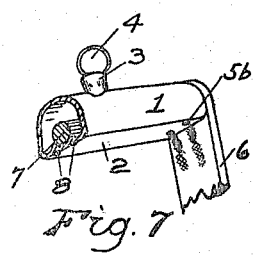
Fig. 7 is a perspective view, broken away in part, indicating the manner of delivery of oil to the sides of the clip.

To keep the tubular spacer from shifting sidewise with respect to the bolt, stops or pressed-up projections 8 may be provided in the bottom of the tube, as shown in Figs. 5 and 7.

In operation the ends of the tubes fit tightly against the upright side members of the clip and together with the closure 4 of the oil inlet constitute an air-tight oil chamber. The capillary apertures in the bottom of this air-tight chamber will not give forth oil unless the clip is subjected to jars or vibration. Consequently when the vehicle is standing still no oil escapes from the chamber or runs down the sides of the leaf spring, but when the vehicle is in motion and the leaf springs are vibrated the oil receptacle acts somewhat after the manner of a shaker-bottle with a very small nozzle, that is, it gives forth only a small amount of oil, feeding it out very slowly. The oil given out passes in an extremely thin film down the inner surfaces of the side members of the clip onto the side edges of the various leaves of the spring and is drawn by capillary action between the rubbing surfaces of the leaves. The lengthwise sliding movement of the leaves on each other distributes the oil over the contacting areas of the leaves and in a short time those areas are thoroughly lubricated, but not to such extent that any oil is wasted by dripping.

If an extra amount of oil is wanted, it can be obtained by quickly opening and closing the cover of the oil inlet to admit air to the oil chamber. The viscosity of ordinary lubricating oil is sufficient to secure the degree of airtightness required in practice.

By the means above described I have produced a simple and inexpensive oil dispensing device that can be quickly applied to existing forms of clip and bolts without any change in their construction and without employing pads or wicks. It feeds oil in very small amounts direct to the leaves of the spring so that practically all the oil goes direct to the surfaces to be lubricated, the movement of the leaves and the jarring of the vehicle together with capillary action providing means for automatically putting the oiler into operation and for stopping it when the vehicle is not in motion.

Having thus described my invention, what I claim and desire to secure by Letters Patent is:

1. A tubular spacer free from capillary material adapted to be clamped by a clip bolt between the arms of a leaf-spring clip, an oil inlet and an air-tight closure for the same, said spacer formed with openings of small area for slow escape of oil from the tubular spacer to the inner faces of said clip arms.

2. An open-ended tubular spacer free from capillary material adapted to be clamped by a clip bolt between the arms of a leaf-spring clip, said tubular spacer formed with capillary openings near its ends and having an oil inlet and an air-tight closure for said inlet.

In testimony whereof, I affix my signature.

WILLIAM L. PADEN.